(12) United States Patent
Stewart

(10) Patent No.: US 8,694,401 B2
(45) Date of Patent: Apr. 8, 2014

(54) SYSTEMS AND METHODS FOR USING ONLINE SOCIAL FOOTPRINT FOR AFFECTING LENDING PERFORMANCE AND CREDIT SCORING

(75) Inventor: Jeffrey Stewart, New York, NY (US)

(73) Assignee: Lenddo, Limited, Hong Kong (HK)

( * ) Notice: Subject to any disclaimer, the term of this patent is extended or adjusted under 35 U.S.C. 154(b) by 0 days.

(21) Appl. No.: 13/349,397

(22) Filed: Jan. 12, 2012

(65) Prior Publication Data

US 2013/0185189 A1 Jul. 18, 2013
US 2014/0052604 A9 Feb. 20, 2014

Related U.S. Application Data

(60) Provisional application No. 61/432,523, filed on Jan. 13, 2011.

(51) Int. Cl.
*G06Q 40/00* (2012.01)
(52) U.S. Cl.
USPC .............................................. 705/35; 705/38
(58) Field of Classification Search
USPC .................................................... 705/35, 38
See application file for complete search history.

(56) References Cited

U.S. PATENT DOCUMENTS

| | | | |
|---|---|---|---|
| 2007/0179827 A1 | 8/2007 | Gupta et al. | |
| 2008/0133391 A1* | 6/2008 | Kurian et al. | 705/35 |
| 2008/0133402 A1 | 6/2008 | Kurian et al. | |
| 2008/0281726 A1 | 11/2008 | Gupta | |
| 2008/0288305 A1 | 11/2008 | LaLuzerne et al. | |
| 2009/0327120 A1 | 12/2009 | Eze et al. | |
| 2010/0010935 A1* | 1/2010 | Shelton | 705/36 R |
| 2010/0153185 A1 | 6/2010 | Ghosh et al. | |
| 2010/0180032 A1 | 7/2010 | Lunt | |
| 2011/0112957 A1 | 5/2011 | Ingram et al. | |
| 2012/0159647 A1 | 6/2012 | Sanin et al. | |
| 2012/0191594 A1* | 7/2012 | Welch et al. | 705/38 |

OTHER PUBLICATIONS

Irani, Danesh; Webb, Steve; Li, Kang; Pu, Calton; "Modeling Unintended Personal-Information Leakage from Multiple Online social networks"; IEEE Internet Computing; May 2011.*
Anonymous; "Internet Computing; Reports Outline Internet Computing Study Findings from Georgia Institue of Technology"; Internet Weekly News; May 30, 2011.*
"Four Degrees of Separation," Lars Backstrom, Paolo Boldly, Marco Rosay, Johan Ugander, Sebastiano Vignay, Nov. 22, 2011, pp. 1-13.
"The Anatomy of the Facebook Social Graph," Johan Ugander, Brian Karrer, Lars Backstrom, Cameron Marlow, Nov. 18, 2011, pp. 1-17.
Young, Lee W., International Search Report and Written Opinion for PCT/US2012/021106, May 21, 2013, 8 pages.

* cited by examiner

*Primary Examiner* — Edward Chang
(74) *Attorney, Agent, or Firm* — LaBatt, LLC

(57) ABSTRACT

Provided are apparatuses, computer media, and methods for analyzing data gathered from the online social footprint and determining a credit score to facilitate access to financial services. A credit score is determined based on available personal data and data gathered from the online social footprint and is indicative of a borrower's propensity to pay an owed amount. A credit score is determined from a scoring expression that is associated with a score cluster, typically including a subset of available data gathered from the online social footprint. The credit score can also be affected by means such as endorsements or negative behavior of individuals in a borrower's social network. Corresponding apparatus, systems, programs for computers, and communications mechanisms are also provided to gain access to financial services based upon at least one borrower's request criterion, optimization of reputation in the borrower's online social footprint and performing a lending transaction.

20 Claims, 16 Drawing Sheets

FIGURE 6

SYSTEMS AND METHODS FOR USING ONLINE SOCIAL FOOTPRINT FOR AFFECTING LENDING PERFORMANCE AND CREDIT SCORING

INCORPORATION BY REFERENCE

All publications, including patents and patent applications, mentioned in this specification are herein incorporated by reference in their entirety to the same extent as if each individual publication was specifically and individually indicated to be incorporated by reference.

FIELD OF THE INVENTION

The present invention generally relates to electronic commerce systems, and more specifically, to online loan and credit application systems that use the application's electronic communication, personal data, and social network as a means to assess credit worthiness and enforce repayment of loans.

BACKGROUND OF THE INVENTION

Fair Isaac & Co. Credit pioneered a credit scoring method that has become widely accepted by lenders as a reliable means of credit evaluation, helping determine the likelihood that credit users (i.e. borrowers) will pay their on their debts.

A borrower is a party which seeks or has secured the temporary use of monetary funds or a nonmonetary object under the condition that the same or its equivalent will be returned, and in many instances with an interest fee. A lending agent is a party which gives or allows the temporary use of monetary funds or a nonmonetary object on the condition that the same or its equivalent will be returned, and in many instances with an interest fee. A lending agent can be a private organization, a sole individual, or a government agency.

A FICO score is generated from this credit scoring method which condenses a borrower's credit history into a single number. Credit scores are calculated by using scoring models and mathematical tables that assign points for different pieces of information which approximate a borrowers future credit performance. Developers of the score-model find predictive factors in the data that can indicate future credit performance. For instance, predictive factors such as the amount of credit used versus the amount of credit available, length of time at a present employer, and negative credit information such as bankruptcy can be revealed in a borrowers credit history.

There are typically three. FICO scores that are computed by data provided by each of the three most prevalent credit bureaus Experian, TransUnion, and Equifax which typically provide FICO scores which lenders rely on to determine credit worthiness. The problem is that in many parts of the world, collectively known as the emerging markets a borrower's credit history cannot be determined because the lending infrastructure does not exist. For example, in the Philippines, due to a lack of a credit rating infrastructure, there is restricted access to microfinance loans and extraordinarily high interest rates as well as societal lack of trust in financial and political infrastructure. Currently, Philippine citizens depend on remittances from overseas family borrowers in order to obtain necessities. These funds do not adequately cover other important expenses such as education, healthcare, and human capital investments. While demand for credit by Filipino consumers is growing at a rate of 10% per year, the banking institutions do not sufficiently supply. Only 10% of all lending by banks is dedicated to these consumer loans. Therefore, traditional lending models do not adequately provide capital to those who demand it in emerging markets. As a result, microfinancing has evolved to enable access to however little credit is available for individuals or small organizations in these emerging markets. (Note that as used herein, the terms "microfinancing," "lending," "loan application process," and "credit application process" and are generally interchangeable.)

Microfinancing can be a quick and easy way to access small loan size. It involves lending amounts typically on the order of less than $25 to individuals or small organizations whom lack the collateral or the capacity to prove to traditional banks that they are able to repay a loan. Traditional financial institutions are hesitant to develop services to provide microfinancing because the costs of processing small loans and the risks involved in lending to such individuals or small organizations. The recipients of microfinancing are regarded as a risky client group because they have a limited financial track record. Therefore, microfinancing typically relies on non-traditional aspects of collateral requirements and unconventional assessment of credit worthiness.

The very parts of the world that consume microfinance have seen a broad adoption of social networks. Social networking services allow participants to interact with online communities who share interests and/or activities, or who are interested in exploring the interests and activities of other clients. Participants of social networking services may create a list of friends representing other participants of the service with which the participants desire to interact, e.g., by sending and receiving emails or instant messages, sharing content such as files or photographs, publishing information, posting comments to a blog site, and so forth.

With the rise of the Internet and the growth of electronic commerce (i.e. e-commerce), the social networking infrastructure has become immensely popular. Many email services have even graduated from the traditional purpose of facilitating electronic communication to capturing the connections between participants' social interactions within the service such as by sending and receiving emails or instant messages, adding contact information in the email address book, and so forth.

When the connections between participants of online social networking services are mapped, a social networking graph results (herein after referred to as "social graph"). Social graph is a term ascribed to scientists working in the social areas of graph theory. Coupling the abstract concept from discrete mathematics of a graph with the relationships between individuals online, the social links a person has can be traced through the Internet activity. The social graph is geared toward the relationships a person has online as opposed to the relationships in the real world, which describes the concept of a social network.

The social graph makes it possible to identify tightly connected groups of participants within the online social network services (e.g., the more participants held in common the more tightly connected two participants may be). The activity of a participant on the social graph can be regarded as the social footprint of that participant.

Social networking online will become essentially ubiquitous as the portable electronic devices (e.g., wireless electronic communication devices, notebook and laptop computers, personal digital assistants (PDAs), mobile telephones, sometimes called mobile phones, cell phones, cellular telephones, multifunctional mobile devices, Smartphones, etc.) continue to expand their reach globally. The more a person participates in social networking services, the bigger the person's online social footprint becomes. In the context of determining a person's credit worthiness (e.g. financial stability, debt level, identity verification, residency status, past behavior in repaying debts, character (e.g. adherence to responsibilities, degree of reliability, level of honesty displayed, reputation, etc.), and so forth, the information about a person through social media profiles and the activity on the social graph provide open and available information to be used in a risk analytic data set from which credit worthiness can be derived. Such information, coupled with demographic data and information a loan application provides, can be utilized not only to verified a person's identity, but also perform a background check, assign a credit score and determine the possibility of defaulting.

The significance of social networks and the importance placed on social standing is unique aspect of the culture in emerging markets. More so than in the West, social standing is often the impetus to following rules. New trends in the elevated importance of online reputation and widespread social and mobile media adoption show promising success for future innovative technology systems.

Accordingly, there exists a need in the art for development of new concepts in electronic commerce systems that will enable an Internet based loan and credit system described herein.

SUMMARY OF THE INVENTION

In summary, the various aspects of the subject matter described herein are directed toward techniques for using personal data provided by an individual user and data gathered from the individual's online social footprint to enable the user to have access to borrowing, financially or non-financially. In implementation, the identity of the individual can be verified, the individual's worthiness of credit for lending purposes can be determined, the individual's trustworthiness can be assessed for the purposes of nonfinancial transactions (e.g. lending equipment, sharing information, renting, barter, swaps, etc.), and the repayment actions of individual's borrowing transactions can be enforced through collection actions leveraging the individual's social footprint. Other advantages may become apparent from the following detailed description when taken in conjunction with the drawings.

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

BRIEF DESCRIPTION OF THE DRAWINGS

In order to show how the invention may be carried into effect, embodiments of the invention are now described below by way of example only and with reference to the accompanying figures in which:

FIG. 6 is an exemplary web page of a user's dashboard in FIG. 3;

DETAILED DESCRIPTION

Reference will now be made in detail to embodiments, examples of which are illustrated in the accompanying drawings. In the following detailed description, numerous specific details are set forth in order to provide a thorough understanding of the present invention. Various aspects of the technology described herein are generally directed towards an online loan and credit system designed for wireless electronic mobile device (e.g., Smartphone) users that combines social networking and lending to enable individuals to simply and securely obtain or supply loans, in a timely and cost-effective fashion.

It will be apparent to one of ordinary skill in the art that the present invention may be practiced without these specific details. In other instances, well-known methods, procedures, components, circuits, and networks have not been described in detail so as not to unnecessarily obscure aspects of the embodiments. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing, communications, data sharing and consistency management in general, particularly in a highly dynamic setting.

Note that as used herein, the terms "user," "borrower", "individual," "client," "participant," "device" and "member" are generally interchangeable.

Figure 1:
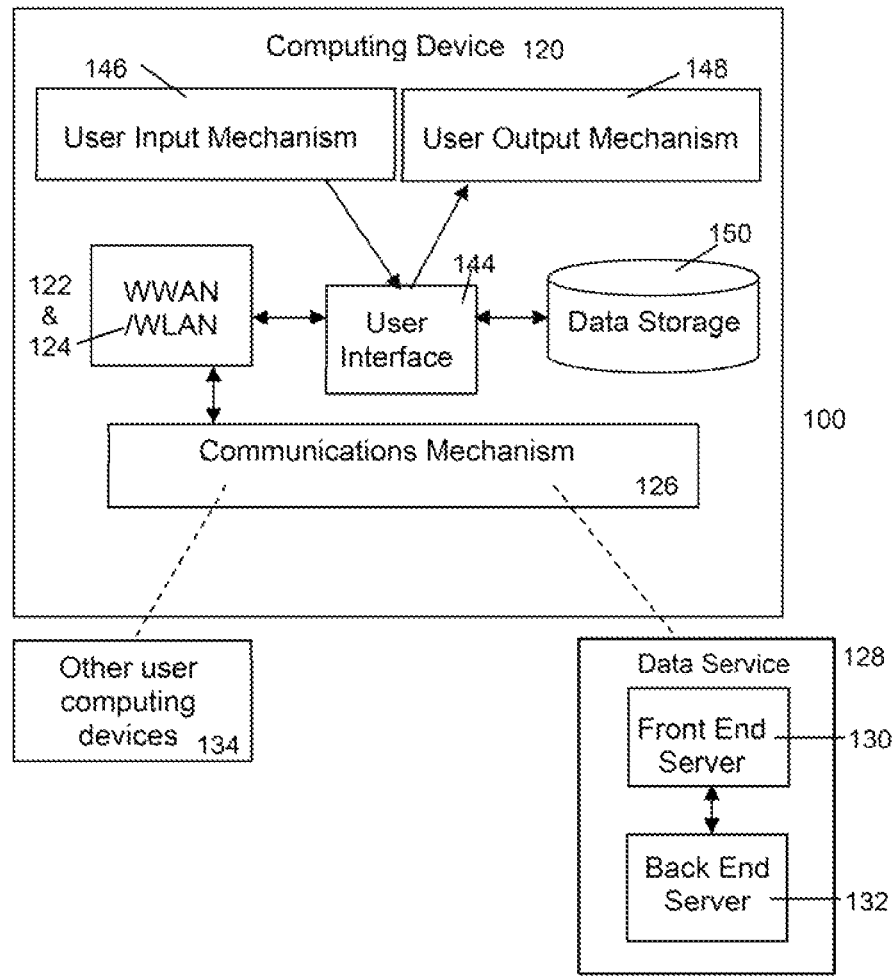
FIG. 1 is an illustration of an exemplary computer network system for implementing embodiments according to the present invention.

As generally represented in FIG. 1, embodiments of computing devices executing software instructions, user interface for such devices, and associated processes for using such devices are described. A user interface can be a website accessed through any means of displaying the system's user interface on a computing device 120, typically an Internet enabled computer website or a software program appropriate for a portable electronic device. The computers may be networked in a client-server arrangement or similar distributed computer network. One or more embodiments can be implemented on a computer network system 100 as illustrated in FIG. 1.

In system 100, a network data service computer 128 is coupled, directly or indirectly, to one or more network user computing devices through a network 110. The network interface between data service 128 and user computing device 120 may include one or more routers that serve to buffer and route the data transmitted between the server and user computing devices. The network may be the Internet, a Wide Area Network (WAN), a Local Area Network (LAN), or any combination thereof.

In one embodiment, the data service 128 is a World-Wide Web (WWW) server that stores data in the form of web pages and transmits these pages as Hypertext Markup Language (HTML) files over the network (i.e. Internet) to the user computing device 120. For this embodiment, the user computing device 120 typically runs a web browser program to access the web pages served by data service 128 and any available content provider or supplemental server.

It will be appreciated that the network connections shown are exemplary and other ways of establishing a communications link between the computers can be used. The existence of any of various well-known protocols, such as TCP/IP, Frame Relay, Ethernet, FTP, HTTP and the like, is presumed, and the computer can be operated in a client-server configuration to permit a user to retrieve web pages from a web-based server. Furthermore, any of various conventional web browsers can be used to display and manipulate data on web pages.

The operation of the computing device can be controlled by a variety of different program components. Examples of program components are routines, programs, objects, components, data structures, and so forth, that perform particular tasks or implement particular abstract data types.

In one embodiment, service 128 in the online credit application process 100 is a server that executes a server side online credit application process. Other versions of this process can include this process being executed on the user computing devices. This process may represent one or more executable program modules that are stored within network service 128 and executed locally within the server. Alternatively, however, it may be stored on a remote storage or processing device coupled to service 128 or network and accessed by service 128 to be locally executed. In a further alternative embodiment, the online credit application process system 100 (herein referred to as "system") may be implemented in a plurality of different program modules, each of which may be executed by two or more distributed server computers coupled to each other, or to network separately.

For an embodiment in which network is the Internet, network data service 128 executes a web server process to provide HTML documents, typically in the form of web pages, to user computing devices coupled to the network. To access the HTML files provided by data service 128, user computing device 120 executes a web browser process that accesses web pages available on data service 128 and other Internet server sites. The user computing device 120 may access the network through an Internet Service Provider (ISP). Data for any of the loan products, credit products, debt products, user information, and the like may be provided by a data store 150 closely or loosely coupled to any of the data service 128 and/or system 100.

The user computing device 120 may be a workstation computer or it may be a computing device such as a notebook computer, personal digital assistant, wireless electronic mobile communication device (e.g., Smartphone), or the like. The user computing device may also be embodied within a mobile communication device, game console, media playback unit, or similar computing device that provides access to the Internet network 110 and a sufficient degree of user input and processing capability to execute or access the system 100. The user computing devices 120 and 134 may be coupled to the data service 128 over a wired connection, a wireless connection or any combination thereof.

As an example implementation, a participating user carries a wireless electronic mobile communication device as an interface to a social networking environment, as described herein. The device is capable of running certain mobile telephone software, and has a wide-area/coverage cellular data service such as GPRS/EDGE, CDMA1x, or 3G. As used herein, such Wireless Wide Area Networking capacity is referred to as "WWAN" such as in "the WWAN connection" of the mobile communication device. Further, the device has short-range wireless networking capability such as through Bluetooth® or Wi-Fi, which is high bandwidth (relative to WWAN) and usually free. Such a short range networking is referred to as "WLAN" herein, as in "the WLAN connection" of the mobile communication device.

These WWAN and WLAN device capabilities are each coupled to a communications mechanism with additional communications software and/or hardware. The WWAN connection is to a service 128, which may comprise a user data server that includes a front-end server 130 and a back-end database 132. As also described below, the WLAN connection is to one or more other client devices 134 in the same social network as the device 120.

Although the exemplified device has such wireless networking capabilities, it should be noted that not every device needs to have the same capabilities. For example, a mobile device such as a PDA or laptop computer need only have a WLAN connection to another device in its social network.

The user interacts with the application, as represented by the user interface (UI component) 144, the user input mechanism 146 and the user output mechanism 148. For example, as represented by the data store 150 in FIG. 1, each user via the device 120 may be a source of text, photos, graphics and/or video clips which may be shared with friends and may be uploaded from the user computing device 120; (note that because wireless communications are often intermittent in nature, some of these data may be cached and stored in some online social networking data servers or the like, e.g., of the data service 128). Thus, as used herein, the term "file content" refers to any such data, including text, images, graphics, audio and/or video, and so forth. The system 100 delivers such different data streams from different sources to a group of loosely-coupled users in a timely and cost-effective fashion.

Figure 2:
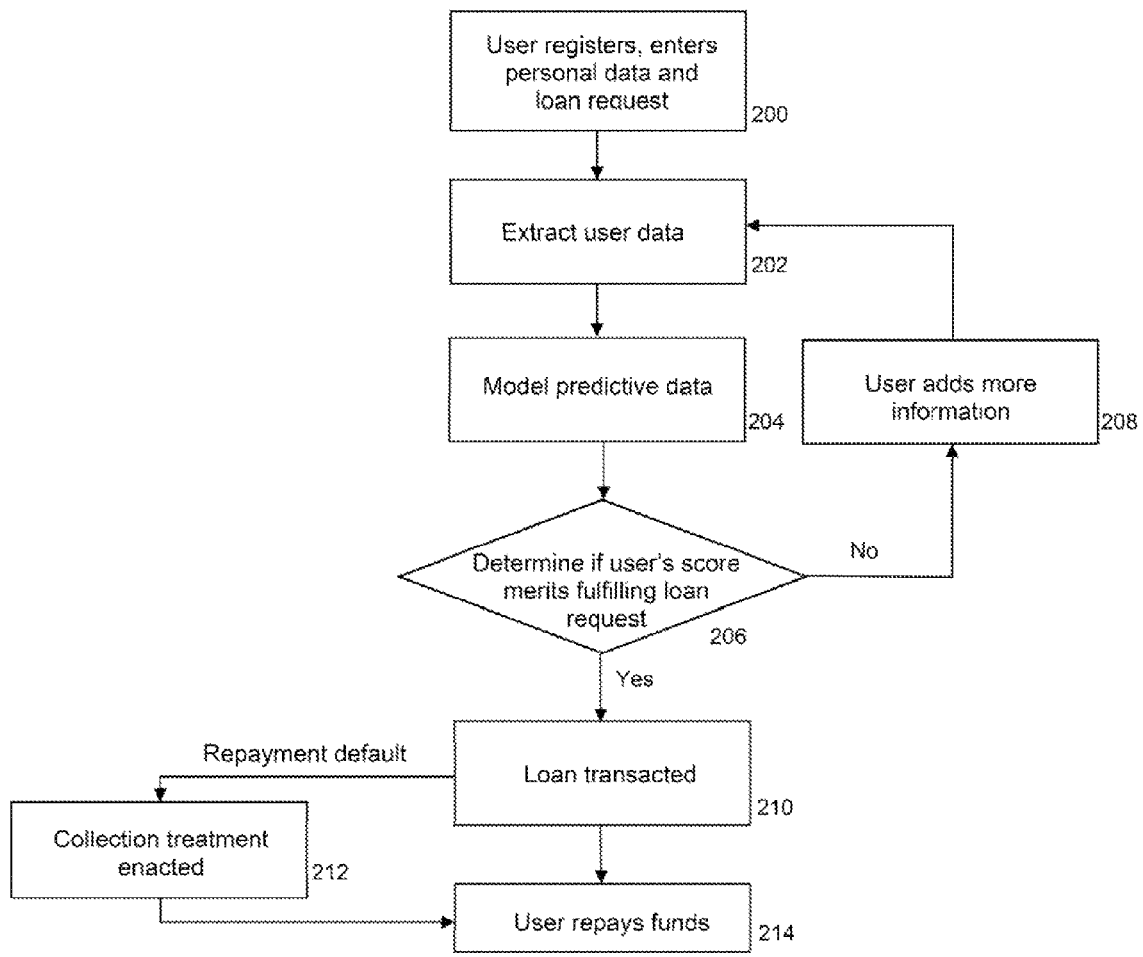
FIG. 2 shows a schematic representation of the method for lending using insight driven borrower interaction on the social graph in accordance with an embodiment of the present invention.
Figure 3:
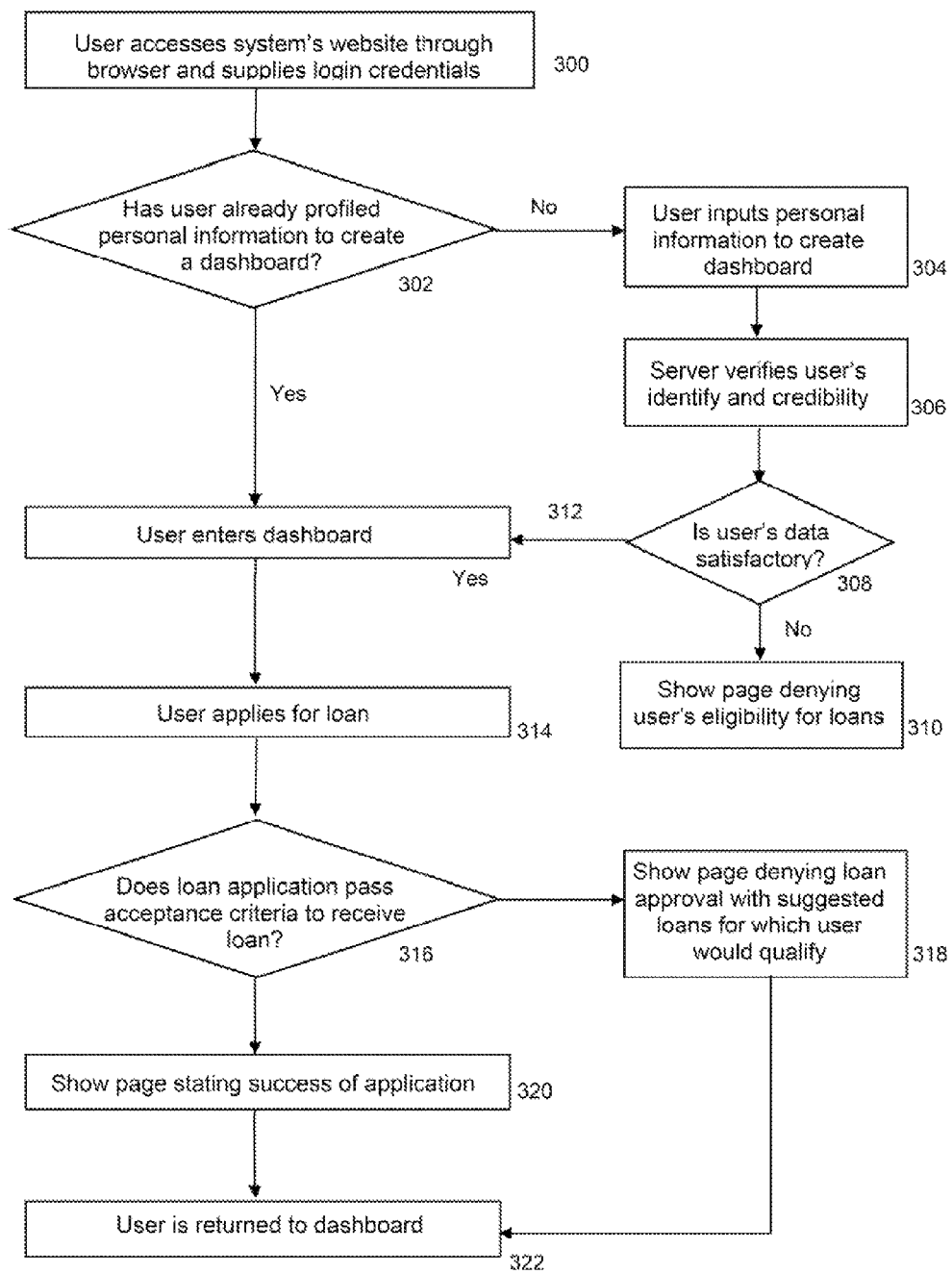
FIG. 3 is a flowchart that illustrates a method of creating a user dashboard and managing a user dashboard, according to an embodiment.

The flowchart of FIG. 2 illustrates an example implementation in which the system 100 facilitates lending using insight driven borrower interaction on the social graph. For the embodiment of FIG. 2, an individual who wants to borrow funds must register with the system, which entails creating a user profile by entering personal data into the system through the system's website or user interface. The website can be accessed through any means of displaying the system's user interface, typically a computer or an application appropriate for a portable electronic device. Now that the individual is registered as a user in the system, the borrower's user profile can be reflected in a dashboard of information for the user. The user, can access a loan application form through his dashboard, which will be displayed on the user's computer or portable electronic device. In block 200, additional tools for the user and dashboard management functions are illustrated in FIG. 3.

Once the user has applied for a loan in block 200, the system 100 through data service 128 searches the social graph to extract user data from the user's online social footprint, block 202.

With respect to the social graph, it is formed using social connections of the users. The social relations of the users may be managed when a new user establishes a profile with the system, the user applies for a loan, the user specifies social connections via a "trusted connection," or the like. Such a list may be recorded at the user data server when the user registers with the system. Because the data server has the social network lists for any registered user, the server can readily derive a social graph or the like for registered users, e.g., social activity as a direct friendship or contact. Provided such a social graph, a user is socially connected not just if another user is a friend, but shares a common user in the social graph with other users. The concept of socially connected members provides for collaboration among users, and tends to reduce potential security or privacy concerns for sharing; a user may also configure a custom membership into a trusted network, e.g., by including or excluding certain others users, setting a number of levels of indirect neighbors allowed, and so forth. A custom user-created trusted network of individuals can involve a complex information-sharing network including but not limited to lenders, borrowers, lending vehicles and social networks comprised of friends, family and other affiliates such as classmates, colleagues, neighbors, teachers and acquaintances.

Referring back to FIG. 2, a general flow of data between a computing device and the data servers includes the data server 128 serving as a communication and storage bridge between different users on the social graph, e.g., the server can host current and historical data for each user. In block 204, user data is blended with the data gathered from the online social footprint and other data as required by the specific requirements of a predictive model. Description of the process flow is provided in FIG. 5, according to an embodiment. The predictive model 204 can function as a credit model providing the configuration for a plurality of score clusters or segments and associated scoring expressions, which is further described below. The information processed and generated through the predictive model 204 enables a determination if the user's score merits the fulfillment loan request or disqualifies the loan application. This determination can be accomplished by generating a credit score. A collection treatment type for the user of the loan application being processed can also be determined. In block 206, the next action is either fulfilling the loan request by supplying the requested funds to the user or requiring the user to take actions to improve his score to qualify for the funds. If in block 206 it is determined that the user does not qualify for the loan, the server displays a page stating that the user did not qualify for the loan for which he applied. Failure to qualify for a loan may be because the credit score does not meet a threshold risk acceptance criteria, the information provided in the data profile cannot be corroborated with the information collected on in the user's social footprint, the login credentials do no work, the members of the user's social network present high risk qualities which weaken the user's credit worthiness strictly through affiliation (i.e. birds of a feather flock together), and so forth.

By way of example, a web page the user is presented can also include reasons explaining why the loan was not granted. In addition, the serve can present the user with alternate loans which the system determines that the user would be able to afford. The server may also display suggestions for ways to improve his credit score, block 208. When it is determined that his credit worthiness has improved and likelihood of qualifying for a loan would likely increase. Actions to improve his credit score can include but are not limited to completing interactive training content about financial responsibility, providing more personal data and increased access to the user's social graph, securing more endorsements from friends and affiliates in a network, and resolving outstanding perceived negative conditions that hurt his credit score. Once more data is available on the borrower the predictive model is updated, as described above, and the matching process in the credit model continues.

In block 206, if it is determined that the user does qualify for the selected loan product, the server notifies the user the loan has been approved and then the terms and conditions of the loan can be accepted, the loan transacted and funds transferred to the user, block 210. Notification of the loan approval to the user can be achieved through several ways including sending an email message, sending a text message, presenting the user with a web page notification, and through a message or indication on the user's dashboard, and so forth.

The funds can be directly deposited utilizing an electronic fund transfer system into the user's bank account as specified in the user's profile information contained in the user's dashboard. The user can repay the loan through digital payment means including but not limited to automatic debit, mobile payments, automatic teller machine (ATM) deposits, prepaid cards, stored value systems, wire transfers, and bank deposits. A loan transaction is considered complete if the user completely fulfills the lending agent's requirements specified in the terms and conditions of the transaction, block 214. In the instance where the transaction is a financial transaction, repays of all outstanding funds owed (including any interest or fees) must be fulfilled to be considered a complete. In the instance where the transaction is nonfinancial, the terms of the transaction must be met such as returning the borrowed entity to the rightful owner by a specified date and in a specific condition.

With regard to the interest rates affixed to the lending transactions, any interest fees can vary widely amongst lending agents. Often they reflect inherently high operational and funding costs associated with rural lending activities and small loan sizes. The present invention allows for the lending of money to occur at an interest rate of less than 100%. In a preferred embodiment of the invention, the interest rates are dependent on the borrower's credit score and local rates in the borrower's country and terms range from a few weeks to few years.

An embodiment of the invention supports the collection treatment of the loan if the borrower is unable to make timely payments toward the repayment of the loan or failing to meet the agreed terms and conditions, block 212. Collection treatment can include publishing the news of a user's loan default or delinquency to various social networks as well as the user's network. Failure by an individual borrower to make timely loan payments can prevent other group borrowers from being able to borrow in the future. A treatment action can also include any combination of affecting the credit worthiness of the character references, family and affiliates through the same means on which their credit worthiness is determined. To be more specific, their'online social footprint can be affected to reflect negative associations such as affiliations with "troubled" borrowers or users, i.e. people who are not able to repay their loan and/or are failing to meet the terms and conditions associated with their loan. Therefore the group will typically want to make the payment on behalf of a defaulting user or, in the case of willful default, may use peer pressure to encourage the delinquent user to make timely payments, effectively providing an informal joint guarantee on the user's loan. Such normative controls incentivize responsible repayments. If problems occur the user's credit score can be decreased if in the future another loan is requested. This ensures credit discipline through mutual support and peer pressure within the group to ensure individual users are prudent in conducting their financial affairs and are prompt in repaying their loans.

In a preferred embodiment, the user's credit score can be negatively impacted by poor repayment performance on a loan either by the user or by someone affiliated with the user.

Once the loan has been repaid by the user, information on the user's loan performance is kept as part of the credit scoring process on the user and those in the user's network. Therefore, the better the performance on a loan, the better it reflects on the user and those within the user's network. A user can manage the personal information as it changes as well as monitor their loan performance and those of others in his network through news feeds, alerts, and messages available on the user's dashboard.

Figure 4:
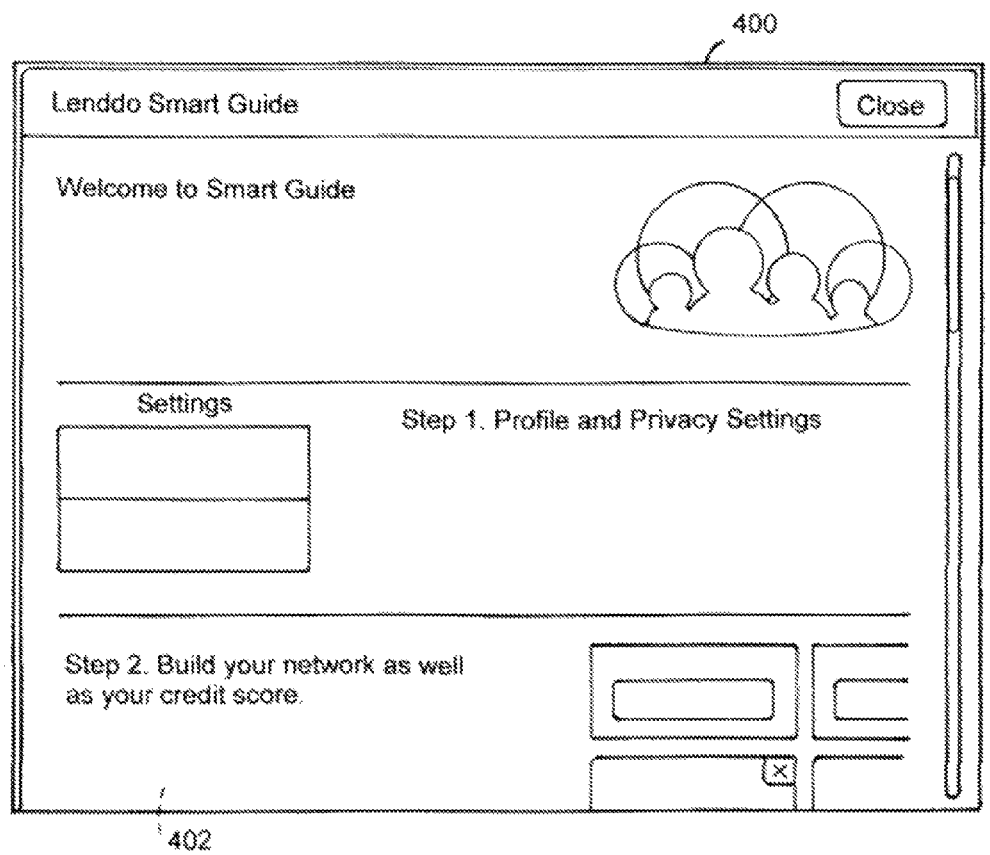
FIG. 4 is an exemplary web page of requested user information in FIG. 3.
Figure 5:
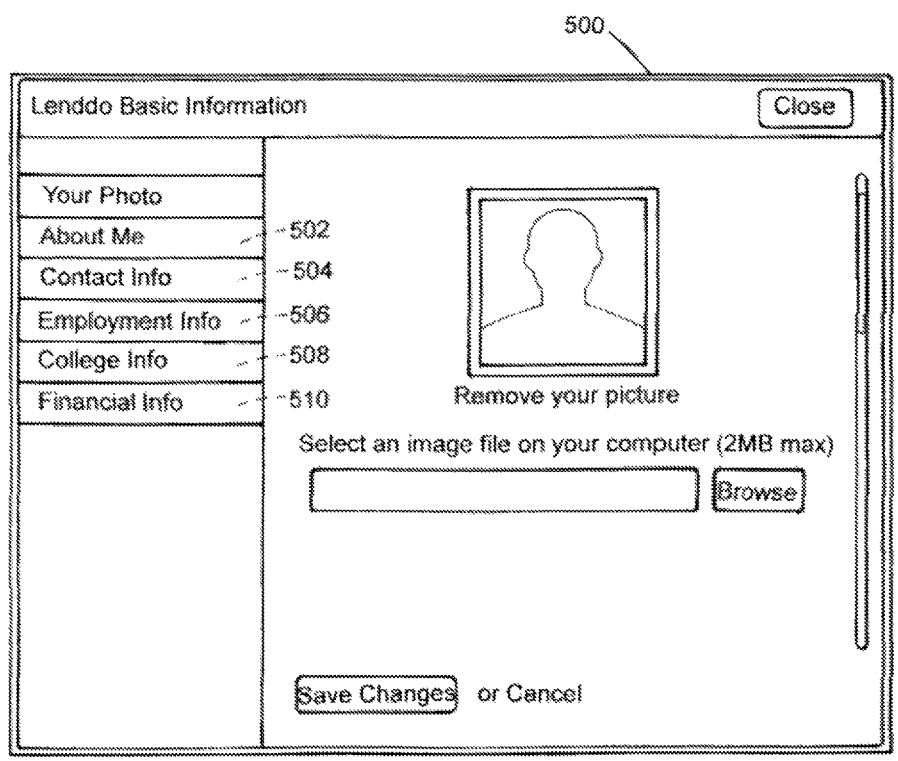
FIG. 5 is an exemplary web page of requested user information in FIG. 3.

FIG. 3 is a flowchart that illustrates a method of creating a user dashboard and managing a user dashboard, according to an embodiment. In block 300, the user engages the system. If the user is an existing user, then the user enters the system's website through the browser and supplies the user's login credentials. In block 304, if the user is new to the system, the user must share his profile by inputting certain items of personal information, such as name 502, address 504, date of birth, employment history 506, the level of education completed 508, income level 510, assets, debts, demographic information, character references, affiliates, associations, any other uniquely identifying items of information such as Tax Identification Number (TIN), Social Security System (SSS) number or Government Service Insurance System (GSIS) number. The user can also be asked to enter information on occupation, near- and long-term goals, monthly earnings, and amount of outstanding debt. Proof of monthly earnings can also be requested. The user's profile also requires the user to list the social networks 402 in the social graph which the user participates or is a member, which can include but are not limited to Twitter, Facebook, LinkedIn, MSN, Yahoo!, Gmail, Google Plus+, MySpace, and MeetUp. FIGS. 4 and 5 illustrate examples of web pages showing types of profile information requested, according to an embodiment.

As part of indicating the social networks, the user is required to verify his login information for his social networks so the server can verify the identity of the user. The information gathered from the social networks in which the user participates can also be used to assess the character and credibility of the user as part of determining how much of a credit risk the user might be. This is illustrated as step 306 in FIG. 3, and an example process flow of this embodiment is further illustrated in FIG. 13.

Figure 6:
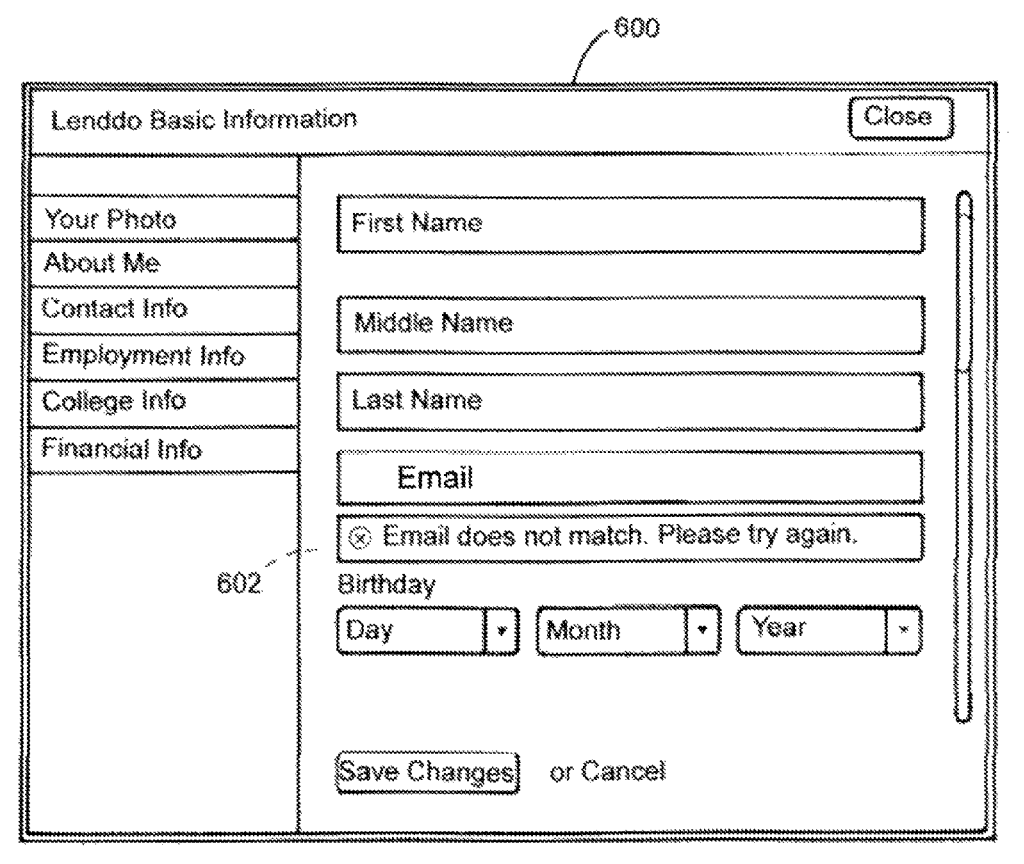

In block 306, the server receives the user's credit assessment report. In general, if the information the system has access to use for determining your credit risk is inconsistent or presents evidence of the user's unreliability or dishonesty, the greater the likelihood that the credit score will be reduced. For instance, if the user indicates in his profile that he works as an engineer but the messages in his social footprint within the past 48 hours of submitting a loan application indicate that he works as a janitor, the data collected about him will not meet some credit scoring criteria. If the system does not determine the user to have an adequate level of credit worthiness based on the scoring expressions in the credit model, i.e. assigned a low credit score, the user may not be permitted to apply for a loan, block 308. The web page of FIG. 6 is intended to represent a possible notification to the user that he has not yet proven to be creditworthy. In the instance of FIG. 6, basic profile information such as an email account, could not be verified 602. If the system determines that the user has an adequate level of credit worthiness, i.e. a credit score that is above a minimum threshold level, the user is then allowed to apply for a loan through the user's dashboard, blocks 310 and 312.

Once the user has access to his dashboard the user can then proceed to use the dashboard management tools as well as apply for a loan, as shown in blocks 312, 314, 316, 318, 320 and 322.

Figure 7:
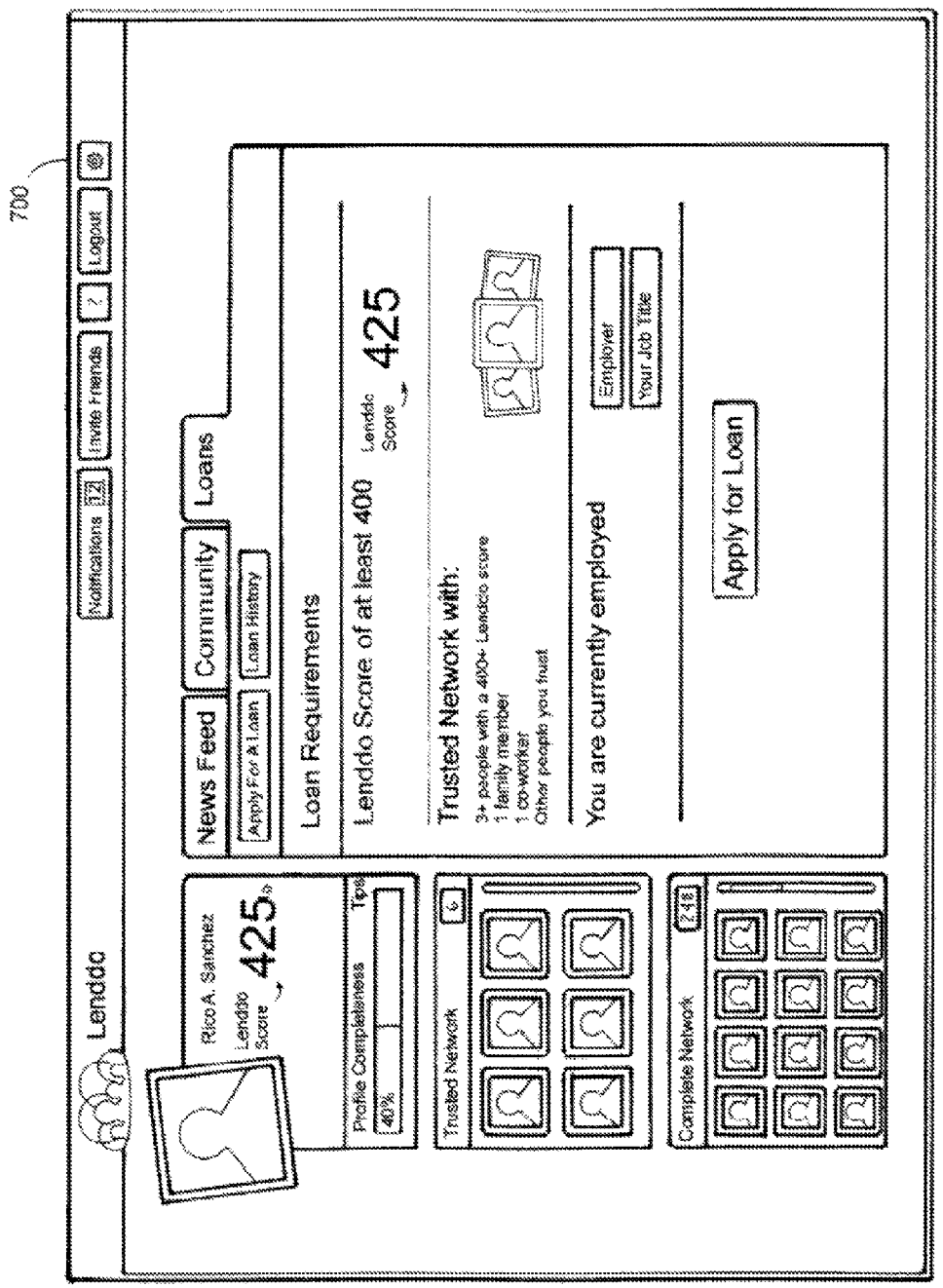
FIG. 7 is an exemplary web page of a user's application for a loan according to an embodiment.

In another embodiment, the system 100 for the online loan application process can be facilitated directly through the dashboard interface 702. FIG. 7 illustrates an example of a web page 700 for a loan application. Web page 700 illustrates a typical loan application page for this online loan application process, and shows data entry areas for the required relevant user information and loan requirements information.

Figure 8:
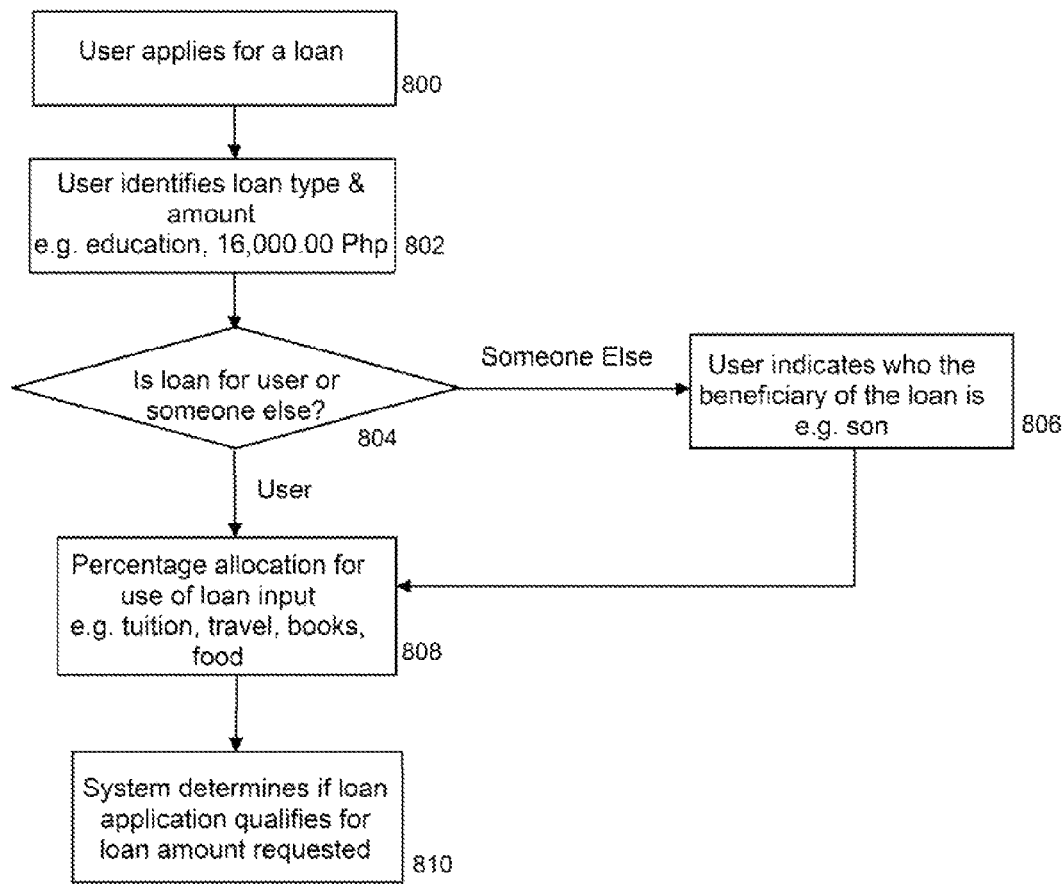
FIG. 8 is a flowchart that illustrates a method of gathering information from the user as part of the loan application, according to an embodiment.

FIG. 8 is a flowchart that illustrates a method of gathering information from the user as part of the loan application, according to an embodiment. For the embodiment of FIG. 8, a user elects to apply for a loan, block 800. In a preferred embodiment, the user can manage this loan application process through the user's dashboard. A loan application is displayed to the user such as through the website shown on the user's computer, through which the application the user is accessing the system such as on a portable electronic device. This loan application form solicits information from the user regarding loan parameters, such as type and amount of loan desired. In block 802, the user inputs loan information that indicates the type or purpose and amount of loan desired. The user can also be required to indicate the beneficiary of the loan being applied for, block 806. For instance, loan may be for the user himself, or the beneficiary of the loan may be for a friend or a relative, such as a child, a sibling, a parent or a cousin. In block 808, the loan application can also request the user to indicate intended usage of the loan as indicated by percent allocation. For instance, if it is an education loan 5% will be spent on travel, 45% will be spent on tuition and 50% will be spent on books.

If the information provided by the user in the loan application is inconsistent with the information that the system finds in the user's social footprint, the approval of the loan may be in jeopardy. For instance, if the user applies for a loan in the amount of 10,165 Php for the purpose of text books for a class he is taking, but the system finds in the user's social footprint no mention of his taking a class in any communications, comments, posts or personal information. Rather the system learns through his recent communications that the user wants to accompany his friends at an upcoming three day music concert selling tickets for a price of 10,165 Php, this calls into question the credibility of the user and the probability of the loan being approved is negatively impacted.

The online loan application process 100 on service 128 determines the user's eligibility based on the type of loan and users credit score characterization, block 810. By way of example, a different loan amount may be determined to be the appropriate recommendation for the user if a criterion for the loan is a function of the user's monthly income, whereby the loan amount may not be able to exceed an amount equal to the user's monthly income. As illustrated in FIG. 3, once the determination 314 has been made through the online loan application process 100 whether or not the user has qualified for the loan, failed to qualify for the loan or has conditionally been approved for a loan but in a recommended different amount, the user is notified, blocks 316 and 318.

Figure 9:
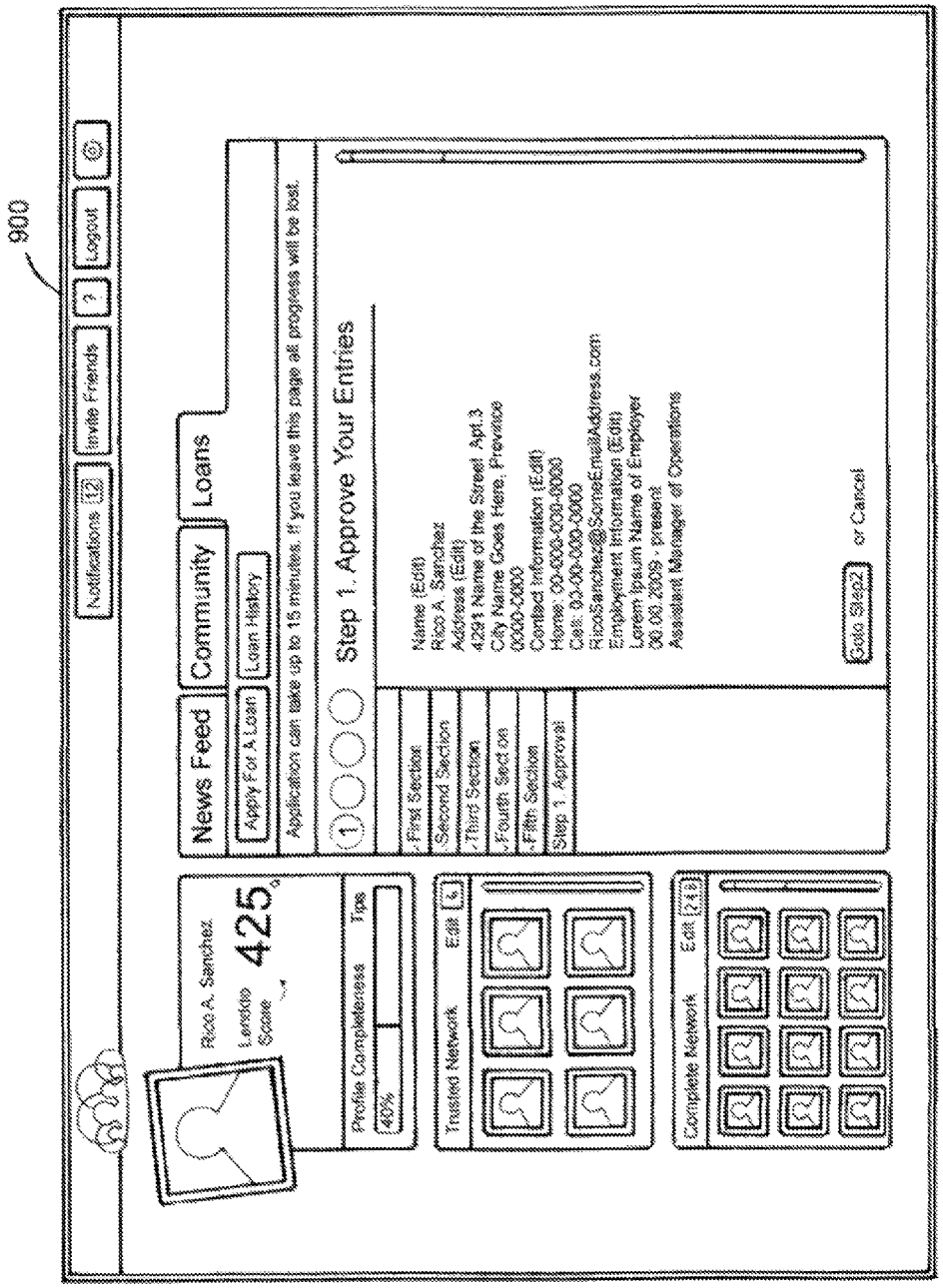
FIG. 9 is an exemplary web page of a user's loan application process, according to an embodiment.
Figure 10:
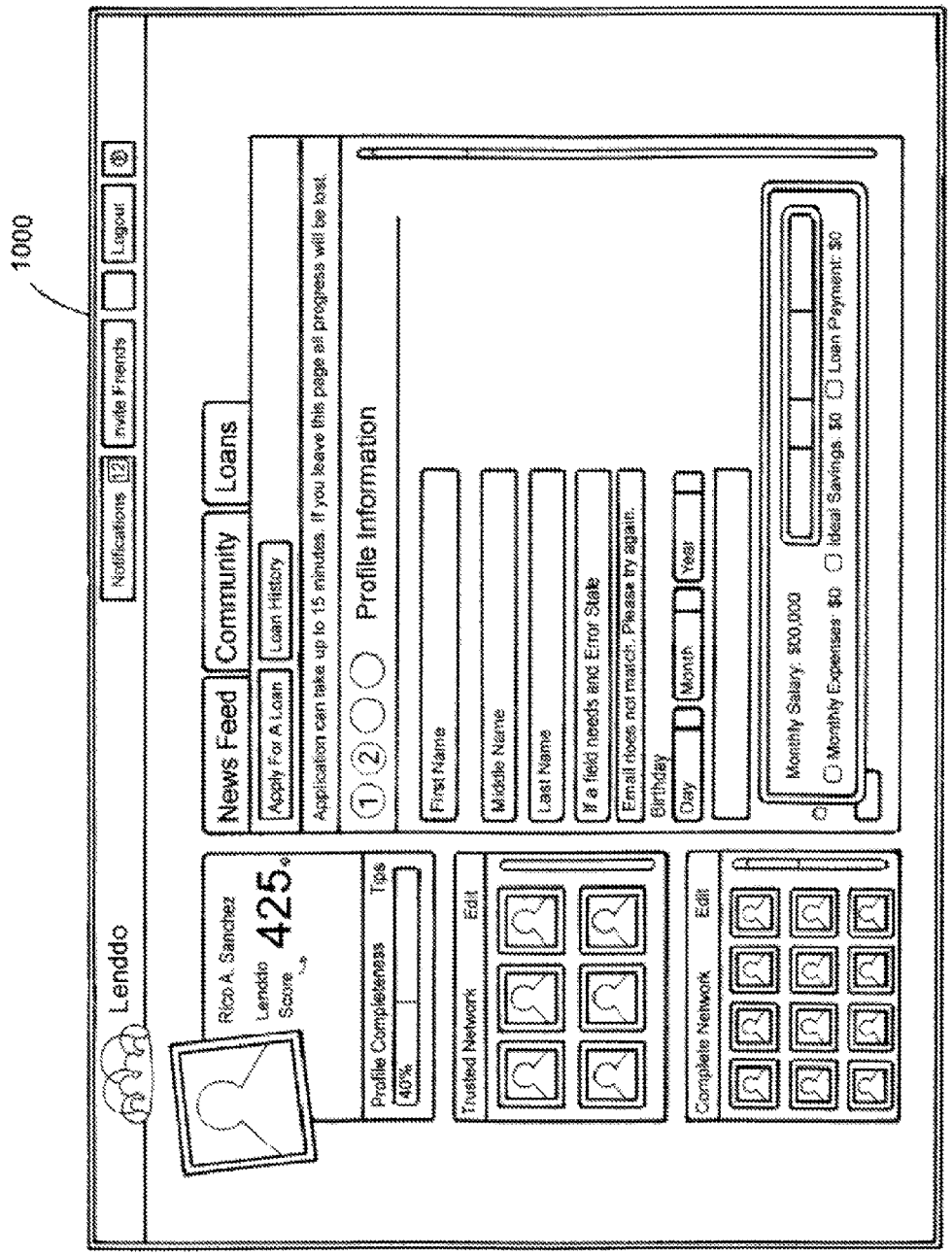
FIG. 10 is an exemplary web page of a user's loan application process, according to an embodiment.

The web page of FIGS. 9 and 10 are intended to be illustrative. Many different formats are possible depending upon the amount of the loan, the type of loan, the credit level of the user and the terms and conditions of the loan.

Figure 11:
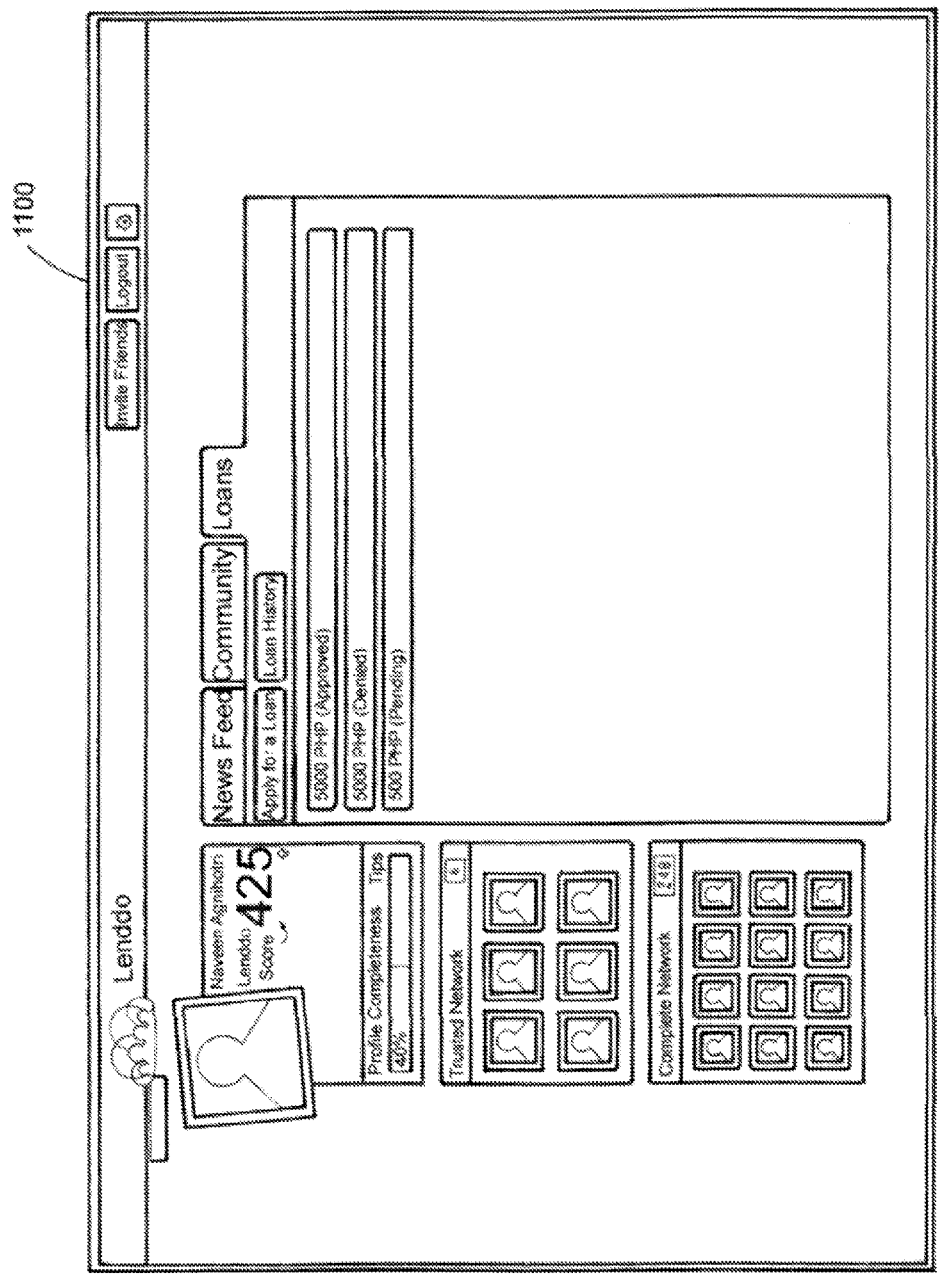
FIG. 11 is an exemplary web page of a user's dashboard indicating the approval of the loan application in FIG. 10.

Also as an embodiment, the user can view the loan status at the user's dashboard as well as manage the loan and repayment activity through it. FIG. 11 illustrates an example of a user's dashboard 1100 indicating the status of a loan application reflecting the approval of the loan as depicted in FIG. 10.

The user's dashboard is also a means by which the user can be notified if someone in the social network of the user has a negative performance on a loan, which could in turn cause the user's credit score to be negatively impacted based on the predictive model. This can be part of the collection treatment actions of someone linked to the user.

Figure 12A:
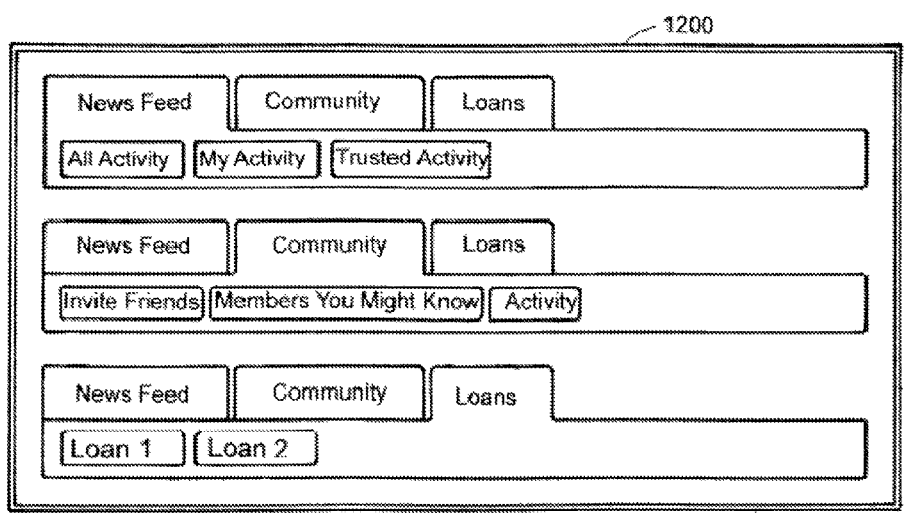
FIGS. 12A and 12B are exemplary web pages of a user's dashboard for managing profile and loans, according to an alternative embodiment.
Figure 12B:
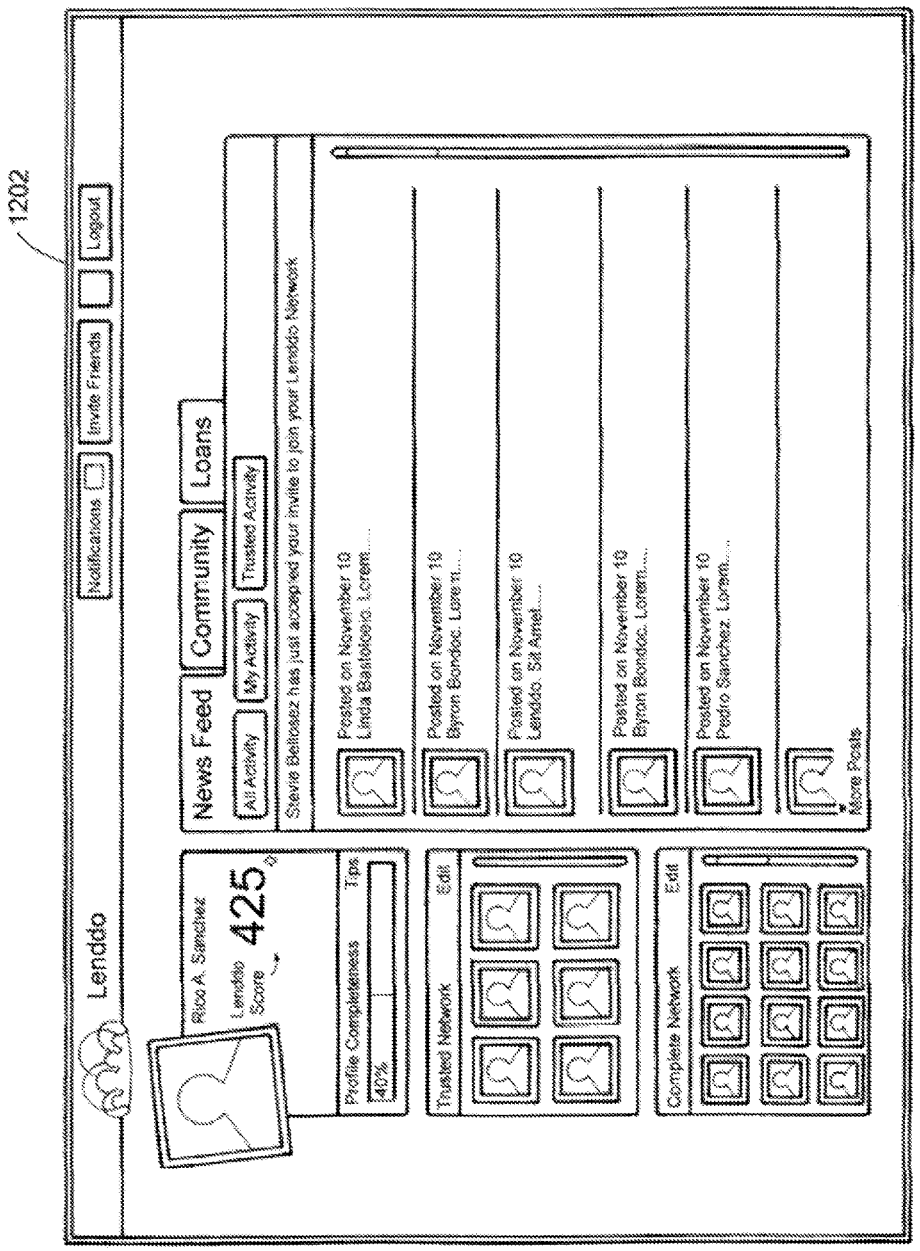

FIGS. 12A and 12B illustrate examples of the tools and account management options a user can have access to through the user's dashboard. Account management capability of the dashboard is important because it introduces a dynamic into the credit score determination of the user that further empowers the user to help influence his credit score. For example, the dashboard allows the user to edit the personal profile information if monthly income amounts change, as well as control who is part of the user's trusted network.

Figure 13:
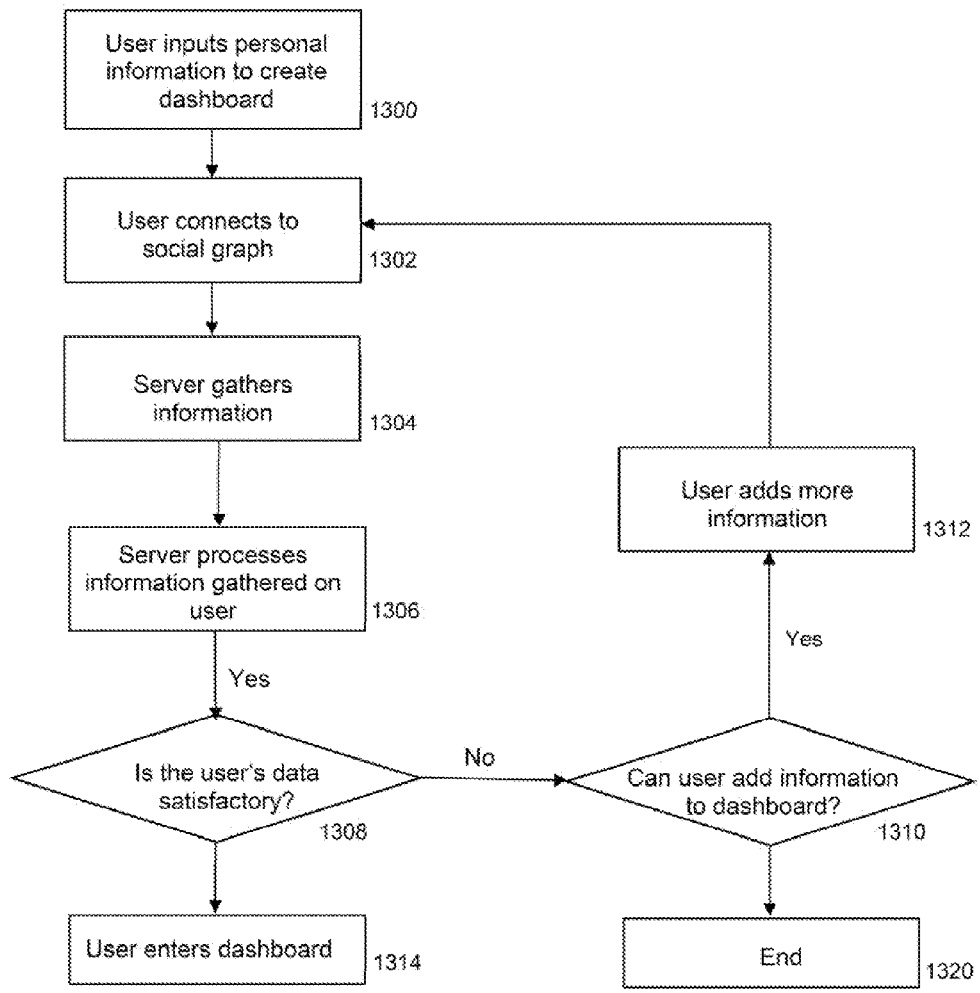
FIG. 13 is a flowchart that illustrates a method of verifying a user's identify and credibility, according to an embodiment.

To help appreciate how the importance of the user's profile information and the dashboard management tools as an important embodiment, FIG. 13 illustrates an example of the flow process in the credit worthiness determination for a user. In conjunction with indicating the social networks for a user's profile, the user is required to verify his login information for his social networks so the server can verify the identity of the user. As mentioned previously, the information gathered from the social networks in which the user participates can also be used to assess the character and credibility of the user, blocks 1302 and 1304, then the information is analyzed using the credit model of the online credit application process 100 to determine how much of a credit risk the user might be, block 1306. This is illustrated as step 306 in FIG. 3, in FIG. 13. If the information gathered from the social networks in which the user participates coupled with the data submitted by the user are satisfactory, i.e. consistent, verifiable, do not present any evidence of distress or dishonesty, and pass any risk acceptance criteria in the predictive model, the user succeeds in establishing his user dashboard and can proceed with applying for a loan.

Figure 14:
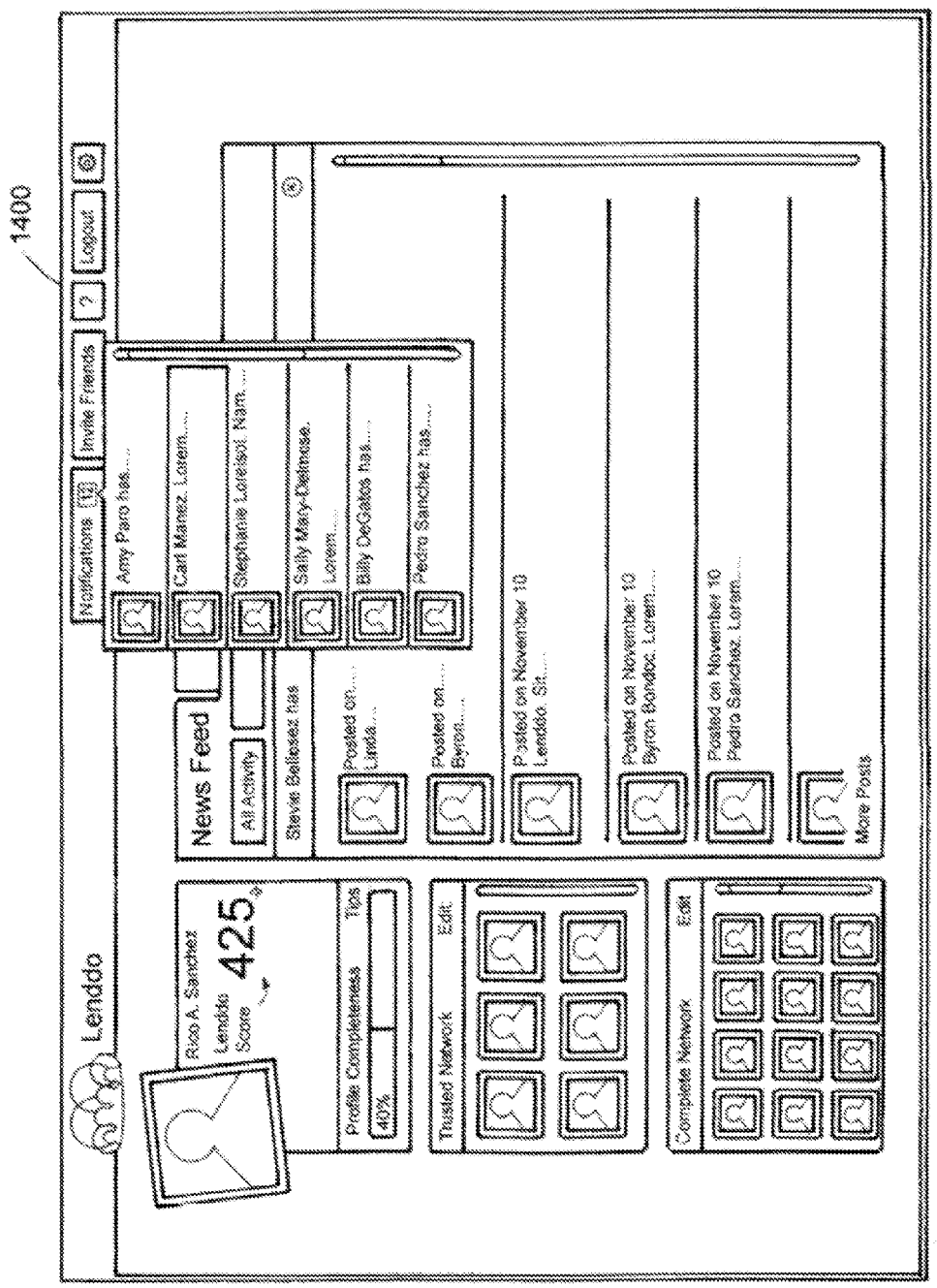
FIG. 14 is an exemplary web page of a user's trusted network, according to an embodiment.
Figure 15:
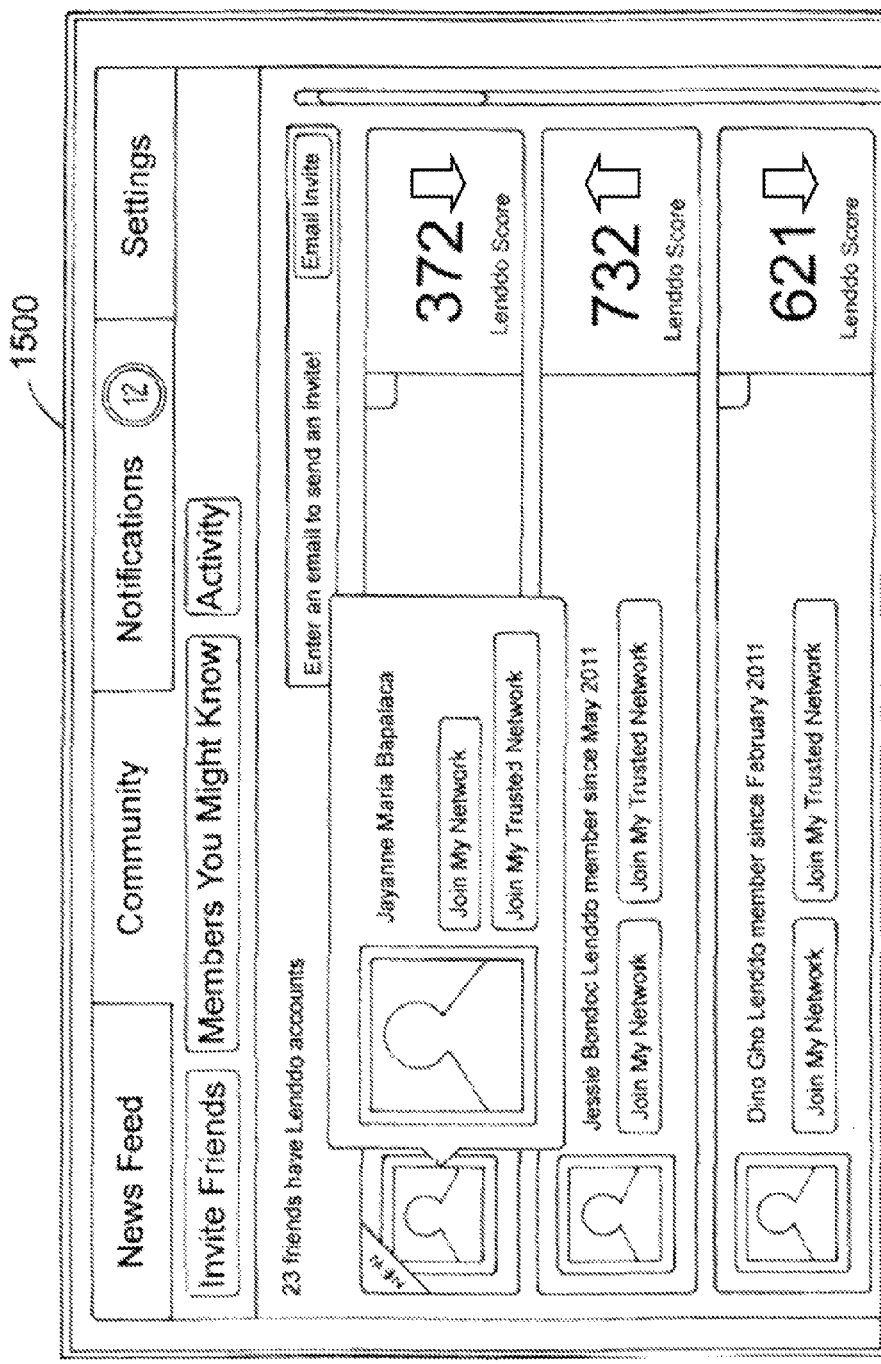
FIG. 15 is an exemplary web page of a user's invitation to a known person for the purpose of endorsement and inclusion into the users trusted network in FIG. 14.

If the credit risk is too high, i.e. the credit score is not at a satisfactory level as determined by the predictive model, block 1308, the user is prompted to add more information to his profile, block 1310. The additional information can go beyond the personal data such as the employment history and education level, block 1312. The additional information can include inviting members of the user's network to make personal referrals and recommendations. A user can also make his community (i.e. social network) stronger by indicating which of his friends and/or family members are most likely to repay loans. An example of a user's trusted network is depicted in FIG. 14. An example web page of a user's invitation to a known person for the purpose of endorsement and inclusion into the user's trust network is depicted in FIG. 15.

With respect to the predictive model, an embodiment of the invention supports the development of unique analytic models to assess a capacity of a user and assign a score or ranking to said user based on data gathered from the online social footprint and other available data on the user. For example, a score generated by the credit model predicts the likelihood of a user to repay a loan. The score can also facilitate the process of lending and collecting by a lending agent. Credit models may blend demographic and financial information input by the borrower that is reflective of a borrower's ability to pay and credit history. The system supports proper security measures surrounding the required personal data and credit information.

In one embodiment, a predictive credit model may be created to determine the credit worthiness of the borrowers based on the data extracted. Predictive models may be created when an initial borrower application is defined. Predictive models are often developed using statistical methods like logistic regression, but data mining technologies like neural nets, decision trees may also be used. Prescriptive models may be defined and executed to determine which borrowers to match with lending agents and which specific borrowers in each segment should be treated with tactical collections treatment. The predictive model may be trained using insight obtained from available personal data and data gathered from the online social footprint and social graph that represent people with the high likelihood to repay debt or the high likelihood not to repay debt. Such training of analytic models is well known in the art, as are the tools to accomplish the modeling. For example, software developed by KXEN, Inc., StarSoft, or SAS may be used.

Insights obtained from available personal data and data gathered online host pattern recognition between those who repay debt and those who do not repay debt, providing means for training the predictive model and determining credit worthiness. Good sources for pattern recognition include word combinations in text indicating deceptive use of loaned funds, or in contrast, corroborating text that affirms the intended use of the funds. Another source of insight of people's behavior toward loans to determine credit worthiness is geospacial data (i.e. location, places of frequent activity, etc.). An individual who is frequently spending time in a location common to other individuals who do repay loans provides such insightful geospacial data, Visual evidence, either by photograph or videos, is another example source of insightful data that evidences behavior common to those who do not repay loans. Biometric information, which is discussed further below, is a further example.

In another embodiment, the data may be extracted from the database to be transformed, aggregated, and combined into standardized thin file records for each borrower. The step of transforming the data may include custom transformations to mine for further data. The data in the file records may be used as input to descriptive and predictive models to determine how likely borrowers are to repay debt. The models may also be used to predict a likelihood of fraud or other behaviors. In a preferred embodiment, the models may be used to affect credit scores of other individuals in a user's online social network.

Payment behavior is modeled on social reputation data and personal information to predict repayment of loans. Prior lending repayment performance is also used for additional predictive power. Using a credit model that is built from developed datasets, determination of credit worthiness can then be performed by using a cluster analysis algorithm to identify evidence in the data to measure social status and reputation. The algorithm used is driven by a lending transaction objective. This in turn permits the distance metrics that are used in the cluster analysis to be calibrated in the context of the stated lending transaction objective. In other words, the invention generates clusters that are more closely aligned with the borrower's case and is therefore a semi-supervised segmentation as opposed to a completely unsupervised segmentation.

The predictive credit model approach described above regarding social status, reputation, endorsements and personal data may be applied to other characteristics that may influence credit worthiness, for example, friendship, affiliates, attitude, habits, purchasing trends, travel patterns, long term goals, extracurricular involvement, and stability. Affiliates may include neighbors, classmates, educators, colleagues, and employers. Attitude may reflect specific endorsements or even a more general holistic view of the borrower held by friends, family and affiliates. Purchasing trends may be a repeat expenses resulting from day-to-day habitual activities. Travel patterns may vary from day-to-day habitual activities such as a daily commute for school or work to extended trips for personal reasons. Long term goals may be an ambition toward a future accomplishment or acquisition. For example, buying more land to expand a farm may be a long term goal. Another long term goal could be completing a higher level of education or vocational training program. Extracurricular activities may be more broadly reflective of hobbies or obligations and can be readily affected by lifestyle and life-stage factors.

Stability of an individual can be reflected in the duration of time in which said individual has lived in a specific location. If a borrower has indicated that he has lived with his parents his entire life and his parents have lived in the same house for 30 years, that indicates more stability than if the parents have been moving to eight different towns in the past five years. Even though there is a perceived stability with having lived with his parents his entire life, the high frequency of moving relative to a short period of time indicates less stability. Stability, or lack thereof, can also be reflected in the pace at which the borrower's lifestyle changes. If the borrower changes friends and/or extracurricular activities frequently, there is a higher correlation to instability than a borrower who has a routine and steady social pattern with friends.

The stored queries are enabled using capabilities of a database management system and a structured query language. A file of the borrower data needed for borrower analytics is created for each new lending request. The borrower data may be extracted by running one or more queries against the stored queries in the database.

The model may dynamically calculate additional variables using predetermined transformations, including custom transformations of an underlying behavior. If additional variables are created, the model may be modified to include the additional variables. The model is often a dynamic view of the customer record that changes whenever any update is made to the database. The definition of the model provides documentation of each data element available for use in models and analytics. It should be appreciated that the architecture by which the predictive model imputes with considers that: age drives obligations; extracurricular activities drives purchasing trends and travel patterns; attitudes toward the borrower by their friends, family and affiliates impacts social standing; habits affect long term goals; life-stage and lifestyle affect travel patterns; education affects long term goals; long term goals affects purchasing trends; social standing reflect life-stage and lifestyle; and so forth.

After aggregated data is gathered from the online social footprint for the identified individuals to one record per individual, ratios based on derived variables are created. The "promising" (those who pay) correspond to individuals who have negligible debt, positive social standing reflected about them in their online social footprint and no conflicts or negative events in their online social footprint. The "troubled" (those who do not pay within a predetermined time duration (performance window)) correspond to individuals who are the opposite. They have measurable debt, questionable social standing reflected about them in their online social footprint and some conflicts or negative events in their online social footprint. Credit attributes are appended to each borrower record.

With an embodiment of the invention, preliminary data analysis for basic checks and data validity may be performed. The predictive credit model can test and verify both the personal information provided by the user as well as the results from the modeling performed using extracted data gathered from the online social footprint. In contrast to a typical static credit model where the models and the data variables are held constant, the credit model of the present invention may be dynamically retrained prior to use in order to capture the latest information available. The information the borrower provides about himself is corroborated so that latest and correct information is associated with the borrower. For instance, as part of the traditional loan approval process personal data such as education can be verified with the institutions the borrower attended for school as indicated by the borrower. Similarly, a phone number can be verified in a telephone directory. However, by using the social graph the information a borrower provides about himself can be corroborated by probability. If the borrower indicates that he works at the Petron Corporation, then there is a high probability that others who work at the Petron Corporation are in his social graph. If there is no one in his social graph that works at the Petron Corporation, then the credit scoring process would flag his profile for a more intensive review and scrutiny at the expense of receiving a strong credit worthiness score. In an alternate example, if the borrower has indicated he is a physician however he writes at a level of a person who is nearly illiterate as evidenced by his text in his social footprint, then his profile would similarly be flagged as suspicious and undergo further scrutiny. By way of an geospacial example, if the borrower states he is a resident of Oaxaco, Mexico for his entire life, however none of his family, friends, colleagues are in Oaxaco, Mexico and the Tijuana, Mexico is frequently referenced in his social footprint, then his profile would be flagged as suspicious with unverifiable personal data.

With another embodiment of the invention, a credit model using data gathered from the online social footprint can identify and rank all future debts on a likelihood of payment during collections process in conjunction to the credit scores. Credit scores generated by the credit model will be used to rank credit worthiness. For instance, a higher score implies that creditor is more likely to pay compared to creditor with a lower score. On the basis of credit scores, differentiated lending treatments can be designed and optimized over time for each risk score cluster of the credit model.

In another embodiment, treatment actions based on the determined treatment type can also be determined as a function of the credit model.

With an embodiment of the invention, predictive modeling is performed using more than 1,000 variables gathered from the online social footprint, to include machine footprint variables such as browser settings, and network fingerprints such as IP address or connection type, credit variables and identified attributes that are predictive in explaining payment behavior. Automated final model equations (scoring expressions) are generated that are used to score individuals who have outstanding debts to find individuals who are most likely to pay owed amounts. With an embodiment of the invention, a scoring expression is a statistical regression equation determined by the statistical tool. The regression equation typically includes only the relevant variables from more than 1,000 mined variables, it is therefore possible that an embodiment only uses one or two key variables.

In another embodiment of the invention, a process for configuring a plurality of score clusters in a credit model. In the process, data gathered from the online social footprint data as previously discussed is analyzed to configure a plurality of score clusters or segments in accordance with desired statistical characteristics. The tree based algorithm finds the top variable which divides the borrowers into segments with similar percentage of "promising" and "troubled." These segments can be defined by risk acceptance criteria. A risk acceptance criterion, for example, can be a debt to income ratio at a specified level. An individual with a greater amount of debt than the amount of income has a debt to income ratio greater than 1.0. A minimum risk acceptance criterion would be a debt to income ratio of less than 1.0. In a preferred embodiment, a risk acceptance criteria for the techniques described herein is the user presenting activity on at least one social network. Put simply, a user must have a social footprint on the social graph.

How the user scores according to the risk acceptance criteria can then be supplied to the algorithm to determine the credit worthiness. The algorithm can incorporate weighting factors that give more importance or less importance to various risk acceptance criteria. The creation and implementation of the algorithm is commonly understood by one of ordinary skill in the art of this invention.

As will be further discussed, the borrowers are assigned to one of the score clusters based on credit score (G) that is determined from the risk acceptance criteria analysis applied to the combination of data gathered from the online social footprint and available personal data.

Each borrower of the sampled population of borrowers is assigned to one of six score clusters or segments based on the associated credit score. For example, a borrowers that satisfies a criteria about age and long-term goals ($301<=G<500$) is assigned to score cluster 2, and borrowers that satisfy criteria about assets and education level ($500<=G<700$) is assigned to score cluster 3, and so on. Even though over a thousand credit and variables based on the data gathered from the online social footprint are available, the scoring expressions are limited to variables rated most important by the lending agent in order to reduce calculations for determining a desired collections objective. Said differently, lending agents can place varying degrees of importance of the factors that determine credit worthiness by ascribing weighting factors in the scoring expressions.

As performed by procedure, an individual is classified into one of six segments on the basis of their credit score. Each of the six score clusters or segments has a separate model equation or scoring expression. Procedure uses the associated scoring expression to determine the collections score. If a borrower is assigned to segment "3" on the basis of borrower's G score, then credit model "3" equation is used to determine the collections score for the borrower. With an embodiment of the invention, procedure determines and can even initiate the collections treatment type that is based on a borrower's assigned collections score. In an embodiment, if two borrowers have the same collections score but are assigned to different segments, the collections treatment type is the same. (However, embodiments of the invention may associate different collections treatment types for the same collections score for different score clusters, i.e., the collection treatment type may be dependent on the score cluster.)

Collections score clusters and treatments may continuously change and improve over time. With the above embodiment, G is used for scoring any borrower. Using G provides additional power to credit models.

According to another aspect of the invention, online biometric information, such as typing habits, verbal audio content, and body images including photos (sometimes called biometrics) can be used to calculate reputation, identity or trustworthiness score. The ability of the process to verify personal data supports the development of a unique human DNA, or biometric database that cross-references online footprint score and identity for use in confirming identity. This embodiment can be not only used for proof of identity, but also help reduce medical paperwork, and prevent fraud.

Additionally, the ability of the process to evaluate a user's character supports the development of reputation scoring that can be used for nonfinancial transactions such as lending equipment, sharing information, renting, barter, and swaps.

According to another embodiment, aspects of the computing device, such as time setting, browser type, browsing history, browser settings (sometimes called machine fingerprint) used to access the service can be used to determine a scoring expression that is associated with identity or trustworthiness.

According to another embodiment, aspects of the network configuration, such as connection type, use of a proxy, IP address, geo-location, WIFI ID, DNS server, or connection speed (sometimes called network fingerprint) can be used to calculate reputation, or trustworthiness score.

In yet another embodiment of the invention, a fee may be collected in a variety of ways including applying for a loan, assessing a credit score, monitoring endorsements and online reputation, as well as helping others in a community by endorsing individuals deemed trust worthy and reputable. Applying fees with associated capabilities of the present invention reduces fraud and ensures that all borrowers have a bank account, proving they are actual people and also have the mechanical ability to pay back.

The present invention involves performing or completing certain selected tasks or steps automatically, manually, or a combination thereof. Several selected steps could be performed by a data processor, such as a computing platform for executing a plurality of instructions. Selected steps of the method and system of the invention could be implemented by hardware or by software on any operating system of any firmware or a combination thereof. For example, as hardware, selected steps of the invention could be implemented as a chip or a circuit. Selected steps of the invention could be implemented as a plurality of software instructions being executed by a computer using any suitable operating system.

Where not defined otherwise, all technical and scientific terms used herein have the same meaning as commonly understood by one of ordinary skill in the art of this invention. The materials, methods, and examples provided herein are not intended to be limiting and are only presented for illustrative purposes. Any range or device value given herein may be extended or altered without losing the effect sought, as will be apparent to the skilled person for an understanding of the teachings herein. Furthermore, computer software and/or data representations may clearly be employed in the design and production of hardware devices or other apparatus embodying the invention and it is to be understood that such programs also fall within the scope of the present invention insofar as they embody a representation of the methods described herein.

As will be apparent to the person skilled in the art, the hardware devices may include a computer system with at least one computer such as a microprocessor, a cluster of microprocessors, a mainframe, and networked workstations. The models of the present invention may be implemented as a computer-readable medium having computer-executable instructions and distributed to a lender over a secure communications channel or as an apparatus that utilizes a computer system. The computer systems may include, but are not limited to, wireless hand-held devices, multiprocessor systems, microprocessor-based or programmable consumer electronics, network PCS, minicomputers, notebook computers, tablet computers, mainframe computers, personal social assistants, Smartphones and the like. A computer system may be incorporated in an apparatus that analyzes input data and consequently initiates a lending transaction. A computer includes a central processor, a system memory and a system bus that couples various system components including the system memory to the central processor unit. System bus may be any of several types of bus structures including a memory bus or memory controller, a peripheral bus, and a local bus using any of a variety of bus architectures. The structure of system memory is well known to those skilled in the art and may include a basic input/output system (BIOS) stored in a read only memory (ROM) and one or more program components such as operating systems, software application programs and program data stored in random access memory (RAM).

Furthermore, the invention may also be practiced in distributed computing environments where tasks are performed by remote processing devices that are linked through a communications network. In a distributed computing environment, program components may be located in both local and remote memory storage devices. The computer can operate in a networked environment using logical connections to one or more remote computers or other devices, such as a server, a router, a network personal computer, a peer device or other common network node, a wireless telephone or wireless personal social assistant.

As for additional details pertinent to the present invention, materials and manufacturing techniques may be employed as within the level of those with skill in the relevant art. The same may hold true with respect to method-based aspects of the invention in terms of additional acts commonly or logically employed. Also, it is contemplated that any optional feature of the inventive variations described may be set forth and claimed independently, or in combination with any one or more of the features described herein. Likewise, reference to a singular item, includes the possibility that there are plural of the same items present. More specifically, as used herein and in the appended claims, the singular forms "a," "and," "said," and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise herein, all technical and scientific terms used herein have the same meaning as commonly understood by one of ordinary skill in the art to which this invention belongs. The breadth of the present invention is not to be limited by the subject specification, but rather only by the plain meaning of the claim terms employed.

What is claimed is:

1. A method implemented in a computer processing system, the method comprising:
for each user in a set of users including at least one user;
analyzing, by a computer, data corresponding to an online social footprint of the user, wherein the online social footprint includes data corresponding to interactions of the user with a social networking service; and
applying, by a computer, at least one scoring expression to the data to generate a credit score of the user;
facilitating, by a computer, a loan between at least two parties which comprise a borrower and a lender based on the analyzing and applying, wherein the borrower corresponds to a user in the set of users; and
performing, by a computer, a collections treatment for the loan, wherein the collections treatment includes affecting an online social footprint of at least one user in the set of users by providing data corresponding to the loan for publication on the social networking service.

2. The method of claim 1, wherein the affecting includes providing the data for publication under a social networking service account of the borrower.

3. The method of claim 1, wherein the affecting includes providing the data for publication under a social networking service account of a user in the set of users distinct from the borrower.

4. The method of claim 1, further comprising:
capturing, by a computer, updated information for a user in the set of users from the online social footprint of the user after the applying, wherein the updated information includes at least one of: word combinations, text, geospatial information or biometric information; and
using the updated information to impact the credit score of at least one user in the set of users.

5. The method of claim 1, further comprising:
mining, by a computer, a plurality of variables in the borrower's online social footprint; and
determining, by a computer, appropriate scoring expressions based on a proper subset of the mined variables.

6. A method implemented in a computer processing system, the method comprising:
evaluating, by a computer, data obtained about a user from at least one social networking service along with information of a user profile for the user to determine a credit score for the user by applying at least one scoring expression;
transmitting, by a computer, a request for more information in response to the credit score not qualifying the user for any loan, wherein the transmitting includes requesting more information, and wherein the requested information includes at least one of: requiring the user to provide, by a computer, at least one more social networking service and log in credentials in which the user participates; requiring the user to include more people in the user's social network; requiring the user to get endorsements, by a computer, from people in the user's social network; requiring the user to build, by a computer, a trusted network within the user's social network; or requiring the user to complete education relevant to lending;
updating, by a computer, the evaluating in response to receiving more information for the user;
receiving, by a computer, a loan application for a loan from the user;
making a determination regarding the loan qualification of the user based on the evaluation of the user information and loan requirements for the loan; and
transmitting, by a computer, the determination of the loan qualification for presentation to the user.

7. A method of claim 6, further comprising transmitting, by a computer, the credit score determined from the at least one social networking service and the information of the user profile for presentation to the user.

8. A method of claim 6, further comprising, if the credit score determination result does not qualify the user for the loan:
transmitting a message, by a computer, for presentation to the user stating that the user is not eligible for the loan.

9. A method of claim 8, further comprising, if the credit score determination result does not qualify the user for the loan
transmitting, by a computer, a message notifying the user of at least one alternative loan for which the user does qualify.

10. A method of claim 6, wherein the requested information further includes requiring the user to provide more personal data.

11. A method of claim 6, further comprising, if the credit score determination result does qualify the user for at least one loan:
transmitting, by a computer, a message to the user stating that the user is eligible to qualify for a loan if a loan application is submitted; and
providing, by a computer, access to the user to a web page hosting the loan application.

12. The method of claim 11, further comprising facilitating a loan transaction between a lender and the user in response to receiving the completed loan application.

13. The method of claim 6, further comprising:
providing, by a computer, a set of web pages for display on a user computing device, wherein the set of web pages request: user information to create a user profile, data identifying at least one social networking service in which the user participates, and login credentials for the at least one social networking service in which the user participates;
accessing, by a computer and without interaction from the user, the at least one social networking service in which the user participates using the login credentials provided by the user; and
obtaining, by a computer, data about the user from the at least one social networking service after the accessing.

14. A method implemented in a computer processing system, the method comprising:
evaluating, by a computer, data obtained about a user from at least one social networking service to which the user belongs and information provided by the user in conjunction with a loan request to determine a loan score for the loan request by applying at least one loan scoring expression, wherein the at least one loan scoring expression determines the loan score using: an evaluation of an accuracy of the information provided by the user in conjunction with the loan request using data corresponding to interactions with the at least one social networking service relating to the user and data corresponding to a payment history of at least one of: the user or at least one user associated with the user in the at least one social networking service;
making, by a computer, a determination regarding a loan qualification of the user based on the loan score and loan requirements for the loan; and
transmitting, by a computer, the determination of the loan qualification for presentation to the user.

15. The method of claim 14, wherein the evaluating includes:
determining, by a computer, that the user is not qualified for the loan based on the evaluation of the data obtained about the user;
transmitting, by a computer, a request for more information in response to the determining, wherein the transmitting includes requesting more information, and wherein the requested information includes at least one of: requiring the user to provide, by a computer, at least one more social networking service and log in credentials in which the user participates; requiring the user to include more people in the user's social network; requiring the user to get endorsements, by a computer, from people in the user's social network; requiring the user to build, by a computer, a trusted network within the user's social network; or requiring the user to complete education relevant to lending; and
updating, by a computer, the evaluating in response to receiving more information for the user.

16. The method of claim 14, wherein the at least one scoring expression generates the loan score using a weighted combination of a subset of a plurality of input variables, wherein the subset of the plurality of input variables and a weighting factor for each of the subset of the plurality of input variables are defined by a lending agent associated with the loan request.

17. The method of claim 14, wherein the at least one scoring expression generates data corresponding to a social standing of the user based on data obtained from the at least one social networking service.

18. The method of claim 14, wherein the at least one loan scoring expression further determines the loan score using at least one of: a machine footprint or a network footprint associated with the user.

19. The method of claim 14, facilitating, by a computer, a loan between the user and a lending agent in response to a determination that the user is qualified for the loan.

20. The method of claim 19, further comprising:
determining, by a computer, at least one payment on the loan has not been timely made; and
performing, by a computer, a collections treatment for the loan in response to the determining, wherein the collections treatment includes affecting an online social footprint of the user by providing data corresponding to the loan for publication on the at least one social networking service.

* * * * *